United States Patent [19]

Miyazaki et al.

[11] Patent Number: 4,658,190
[45] Date of Patent: Apr. 14, 1987

[54] REDUCED RIPPLE DRIVE CIRCUIT FOR A BRUSHLESS MOTOR

[75] Inventors: Kiyoshi Miyazaki; Jinichi Ito; Hayato Naito, all of Nagano, Japan

[73] Assignee: Kabushiki Kaisha Sankyo Seiki Seisakusho, Nagano, Japan

[21] Appl. No.: 665,207

[22] Filed: Oct. 26, 1984

[30] Foreign Application Priority Data

Oct. 27, 1983 [JP] Japan .................... 58-201810

[51] Int. Cl.$^4$ ................................ H02P 6/02
[52] U.S. Cl. ..................... 318/254; 318/138; 318/439
[58] Field of Search ............... 318/138, 254, 439

[56] References Cited

U.S. PATENT DOCUMENTS 4,354,145 10/1982 Janssen ................ 318/138 X

FOREIGN PATENT DOCUMENTS

| 55-120364 | 9/1980 | Japan | 318/254 |
| 57-145559 | 9/1982 | Japan | 318/254 |
| 58-93482 | 6/1983 | Japan | 318/254 |
| 58-159687 | 9/1983 | Japan | 318/254 |

*Primary Examiner*—William M. Shoop, Jr.
*Assistant Examiner*—Bentsu Ro
*Attorney, Agent, or Firm*—Sughrue, Mion, Zinn, Macpeak, and Seas

[57] ABSTRACT

A drive circuit for a three-phase brushless motor in which two Hall detectors are spaced 120° apart in electrical angle near the rotors to detect magnetic flux signals for two phases. Their outputs are summed and inverted to form the third phase signal. The three phase signals drive the respective coils on the stator. The three phase signals are also separately squared and then added to adjust, in a feedback fashion, the current through the Hall detectors, whereby torque ripple is reduced.

4 Claims, 14 Drawing Figures

REDUCED RIPPLE DRIVE CIRCUIT FOR A BRUSHLESS MOTOR

BACKGROUND OF THE INVENTION

This invention relates generally to motors. In particular, it relates to a drive circuit for a three-phase brushless motor.

A conventional three-phase brushless motor drive circuit generally employs a 120° switching system. However, the system suffers from difficulties that both acoustic noise and electrical noise are generated. Furthermore, the resultant torque is not uniform because a coil switching operation is carried out. In order to eliminate the difficulties, an analog energization system as shown in FIG. 1 has been proposed. Hall elements 1, 2 and 3 receive current through resistors 6 and 7 from power sources 4 and 5. They are positioned so that they detect magnetic flux from a rotor magnet on the motor. The output voltages of the Hall elements 1, 2 and 3 are amplified by amplifiers 9, 10 and 11 and are then applied to drive coils 12, 13 and 14, respectively. The current through the coils 12-14 cause the rotor magnet 8 to rotate. If it is assumed that, as shown in FIG. 2, the output voltages u, v and w of the Hall elements 1, 2 and 3 vary sinusoidally with the electrical angle $\theta$ of the rotor 8, then the voltage can be represented by $u = \sin \theta$, $v = \sin(\theta - \frac{2}{3}\pi)$ and $w = \sin(\theta - 4/3\pi)$. The normalized output waveforms of the amplifiers 9, 10 and 11 are then represented by $u = \sin \theta$, $v = \sin(\theta - \frac{2}{3}\pi)$ and $w = \sin(\theta - 4/3\pi)$, respectively. The torque conversion functions $K_u$, $K_v$ and $K_w$ of the different phases are represented by $K_u = \sin \theta$, $K_v = \sin(\theta - \frac{2}{3}\pi)$ and $K_w = \sin(\theta - 4/3\pi)$. As a result the torque of $T_m$ of the motor is:

$$T_m = U \cdot K_u + V \cdot K_v + W \cdot K_w$$

$$= \sin^2\theta + \sin^2\left(\theta - \frac{2}{3}\pi\right) + \sin^2\left(\theta - \frac{4}{3}\pi\right)$$

$$= 3/2$$

That is, an ideal motor would produce no torque ripple, as shown in FIG. 2.

However, in the analog energization system, in general the outputs of the Hall elements fluctuate in amplitude, phase and offset among three phases thereof. Therefore, in practice, the outputs, being affected by these factors, produce torque ripple. A more realistic expression for the output of a representative amplifier 10 is $V = K \sin(\theta - \frac{2}{3}\pi + P) + L$, (where K is the amplitude shift, P is the phase shift, and L is the offset). The voltage waveforms and the resultant ripples are illustrated in FIGS. 3A-3D for the realistic voltage waveform V but with the voltages U and W assumed to be ideally matched. FIG. 3A shows the ideal state (K=1, P=0, and L=0) for which no torque ripple is produced. FIG. 3B shows the case where the peak value of the phase V is 70% of that for U and W (K=0.7). The resultant torque ripple is 22.2%. FIG. 3C shows the case where the offset L of the phase V is 20%. The resultant torque ripple is 26.7%. FIG. 3D shows the case where the phase shift P is 15°. The resultant torque ripple is 17.6%. In the cases shown in FIGS. 3B and 3C, there is a difference r between the peak values of the phase V and the peak values of the phases U and W and therefore the operating voltage range is reduced when it is clipped to the supply voltage. Furthermore, the three-phase balancing condition $U + V + W = 0$ cannot be maintained. To counteract this problem, the power sources 4 and 5 are replaced by a single power source. However with a single power source, the imaginary ground potential is not well defined so that the operation of the system becomes unstable.

SUMMARY OF THE INVENTION

An object of this invention is to provide a drive circuit for a brushless motor in which the three-phase balancing condition is held, the torque ripple is decreased, and the three phases have uniform peak values.

The invention can be summarized as a drive circuit for a three-phase brushless motor in which two Hall elements mounted 120° apart in phase near the rotor of the motor detect the magnetic flux for two phases. The outputs of the Hall elements are added to synthesize the signal for the third phase. Each phase signal, besides driving the respective coil in the stator of the motor, is squared and added to form a feedback current to both Hall elements. The feedback current controls the sensitivity of the Hall elements.

BRIEF DESCRIPTION OF THE DRAWINGS

This invention will be described with reference to the accomanying drawings in detail.

DETAILED DESCRIPTION OF THE PREFERRED EMBODIMENTS

Figure 4:
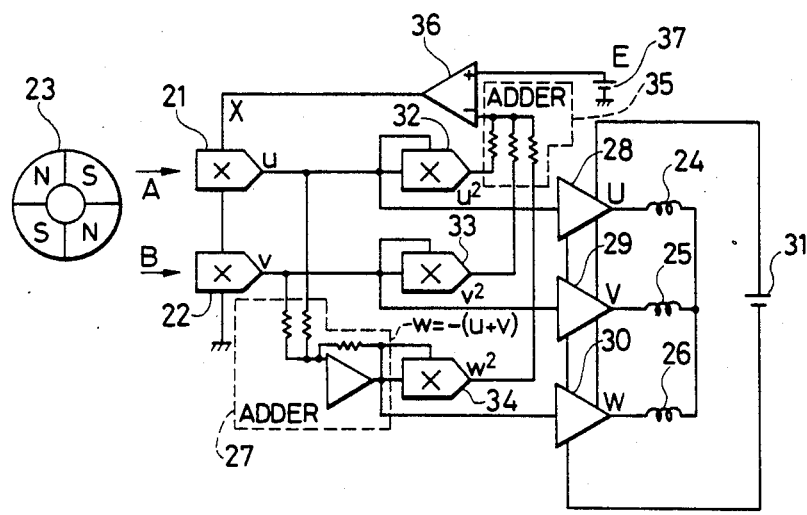
FIG. 4 is a block diagram showing the embodiment of the invention.

FIG. 4 shows one embodiment of the invention. In FIG. 4, Hall elements 21 and 22 together form a position detector for a rotor magnet 23. They operate as multipliers which produces outputs proportional to X·A and X·B by detecting magnetic fluxes A and B from the poles of the rotor magnet 23 based upon an input current X to both Hall elements 21 and 22. The Hall elements 21 and 22 are arranged so as to have a phase difference of 120° (electrical angle) with respect to the rotor 23. The position detector comprising the Hall elements may be replaced by an optically operated detector, magnetic resistance elements and the like if the detector sensitivity can be controlled. The rotor magnet 23 is already magnetized to have 2n poles (n being an integer greater than zero). The rotor magnet is caused to turn by three-phase drive coils 24, 25 and 26. Because the spatial distribution of magnetization of the rotor magnet 23 is sinusoidal or substantially so in the rotational direction, the output voltages u and v of the Hall elements 21 and 22 are also sinusoidal.

An adder 27 is used to synthesize the third phase's position signal w. In the adder 27, the outputs u and v of the Hall elements 21 and 22 are added, and the result of addition is inverted to provide the third phase's position signal $w = -(u+v)$.

The output voltages u and v of the Hall elements 21 and 22 and the output voltage w of the adder 27 are amplified by amplifiers 28, 29 and 30 to drive the coils 24, 25 and 26, respectively. The amplifiers 28, 29 and 30 are energized by a DC source 31. The output voltages u and v of the Hall elements 21 and 22 and the output voltage w of the adder 27 are also applied to both inputs of multiplying circuits 32, 33 and 34 where they are squared into $u^2$, $v^2$ and $w^2$, respectively. These values are applied to an adder 35, which outputs a signal proportional to $u^2 + v^2 + w^2$. The output voltage of the adder 35 is compared in a differential amplifier 36 with a reference voltage E of a reference voltage source 37. The output current X of the amplifier 36 corresponds to the difference of these voltages and is fed back to the Hall elements 21 and 22. Accordingly, the currents of the Hall elements 21 and 22 are so controlled that $u^2 + v^2 + w^2 = E$ is held constant by the feedback loop.

If the magnetic flux signal for the first phase and the magnetic flux signal for the second phase applied to the Hall elements 21 and 22 are represented by $A = \sin \theta$ and $B = \sin (\theta - \frac{2}{3}\pi)$ respectively, then the remaining signal, i.e., the third phase magnetic flux signal C, can be represented by $C = -(A+B) = \sin (\theta - 4/3\pi)$. The output voltages u and v of the Hall elements 21 and 22 and the output voltage w of the adder 27 are as follows:

$$u = X \cdot A;$$

$$v = X \cdot B;$$

and $$w = -X \cdot (A+B),$$

where X is the current input value that determines the sesitivity of the Hall elements 21 and 22. The three-phase balancing condition is automatically maintained by the summing at the adder 27. Temporal fluctuations of various factors of the phases can be compensated by holding $u^2 + v^2 + w^2 = E$, as is done in the feedback. Taking into account the dependence of w upon u and v, the amount of feedback current X is:

$$X = 1/[2 \cdot (A^2 + B^2 + AB)]^{\frac{1}{2}}, [E=1]$$

When the outputs of the Hall elements are normalized, the driving waveforms U, V and W of the coils 24, 25 and 26 are:

$$U = A/[2 \cdot (A^2 + B^2 + AB)]^{\frac{1}{2}},$$

$$V = B/[2 \cdot (A^2 + B^2 + AB)]^{\frac{1}{2}},$$

and $$W = C/[2 \cdot (A^2 + B^2 + AB)]^{\frac{1}{2}}.$$

If the torque conversion functions (corresponding to electromotive force waveforms) $K_u$, $K_v$ and $K_w$ of the phase are represented by $K_u = \sin \theta$, $K_v = \sin (\theta - \frac{2}{3}\pi)$ and $K_w = \sin (\theta - 4/3\pi)$, respectively, then the motor torque $T_m$ is:

$$T_m = U \cdot K_u + V \cdot K_v + W \cdot K_w.$$

Figure 1:
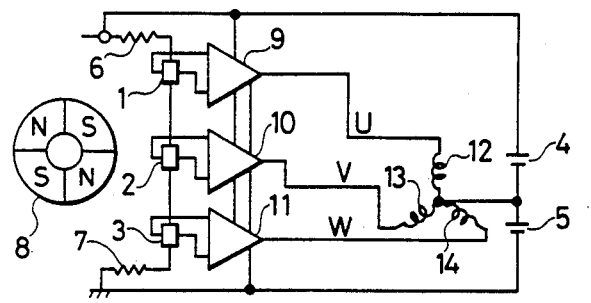
FIG. 1 is a block diagram showing a conventional analog energization system.
Figure 2:
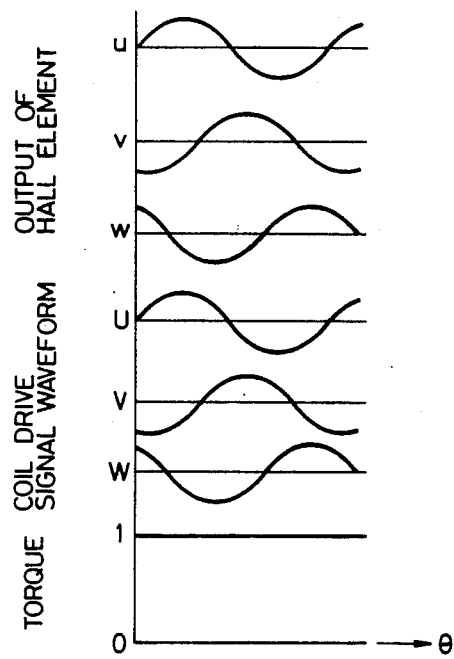
FIG. 2 is a waveform diagram showing the waveforms and torques at various circuit points in the system of FIG. 1.
Figure 3A:
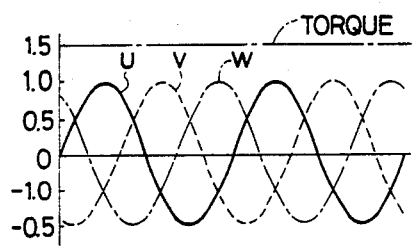
FIGS. 3A-3D are waveform diagrams describing the results of experiments on torque ripple in the conventional system.
Figure 5A:
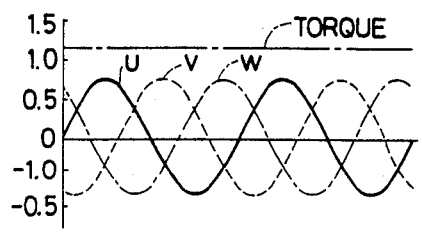
FIGS. 5A-5D are waveform diagrams corresponding to FIGS. 3A-3D, with the same magnetic flux waveforms but, instead, using one embodiment of the invention.
Figure 3B:
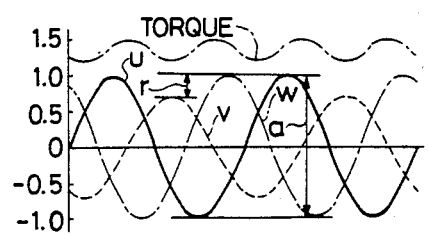
Figure 5B:
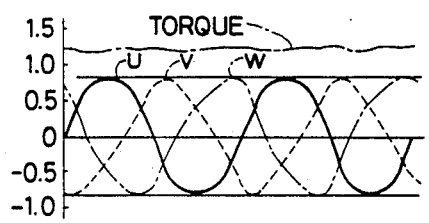
Figure 3C:
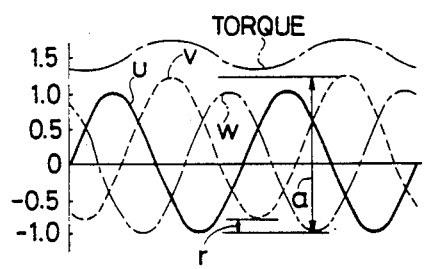
Figure 5C:
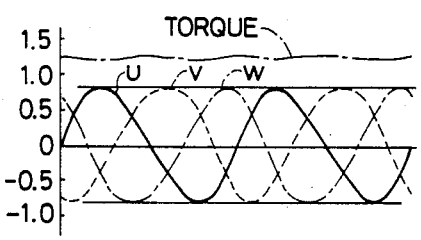
Figure 3D:
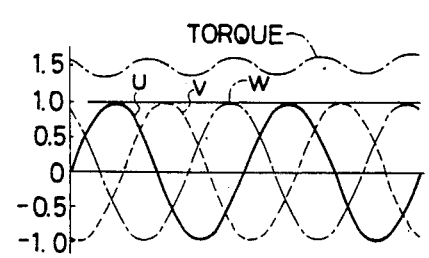
Figure 5D:
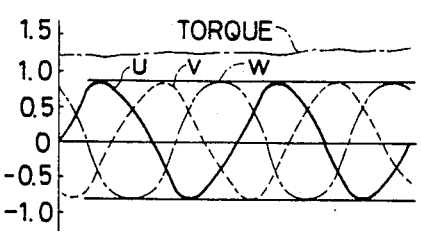

With the more realistic waveform $B = K \sin (\theta - \frac{2}{3}\pi + P) + L$ (where, as previously, K is the amplitude shift, P is the phase shift, and L is the offset), the torque ripple produced by the present invention is shown by FIGS. 5A-5D. FIG. 5A shows the ideal (K=1, P=0, and L=0) in which no torque ripple is produced, just as in FIG. 3A. FIG. 5B shows the case where the amplitude shift is 30% with the resultant torque ripple being 4.7%. FIG. 5C shows the case where the offset is 20% and the resultant torque ripple is 2.7%. FIG. 5D shows the case where the phase shift is 15° and the resultant torque ripple is 3.8%. Because the peak values of different phases are held equal to each other, the supply voltage clipping levels are also equal to one another, and the condition $u + v + w = 0$ is maintained. Therefore, the drive coils maintain a constant imaginary ground potential, and the rotating system is stabilized.

Figure 6:
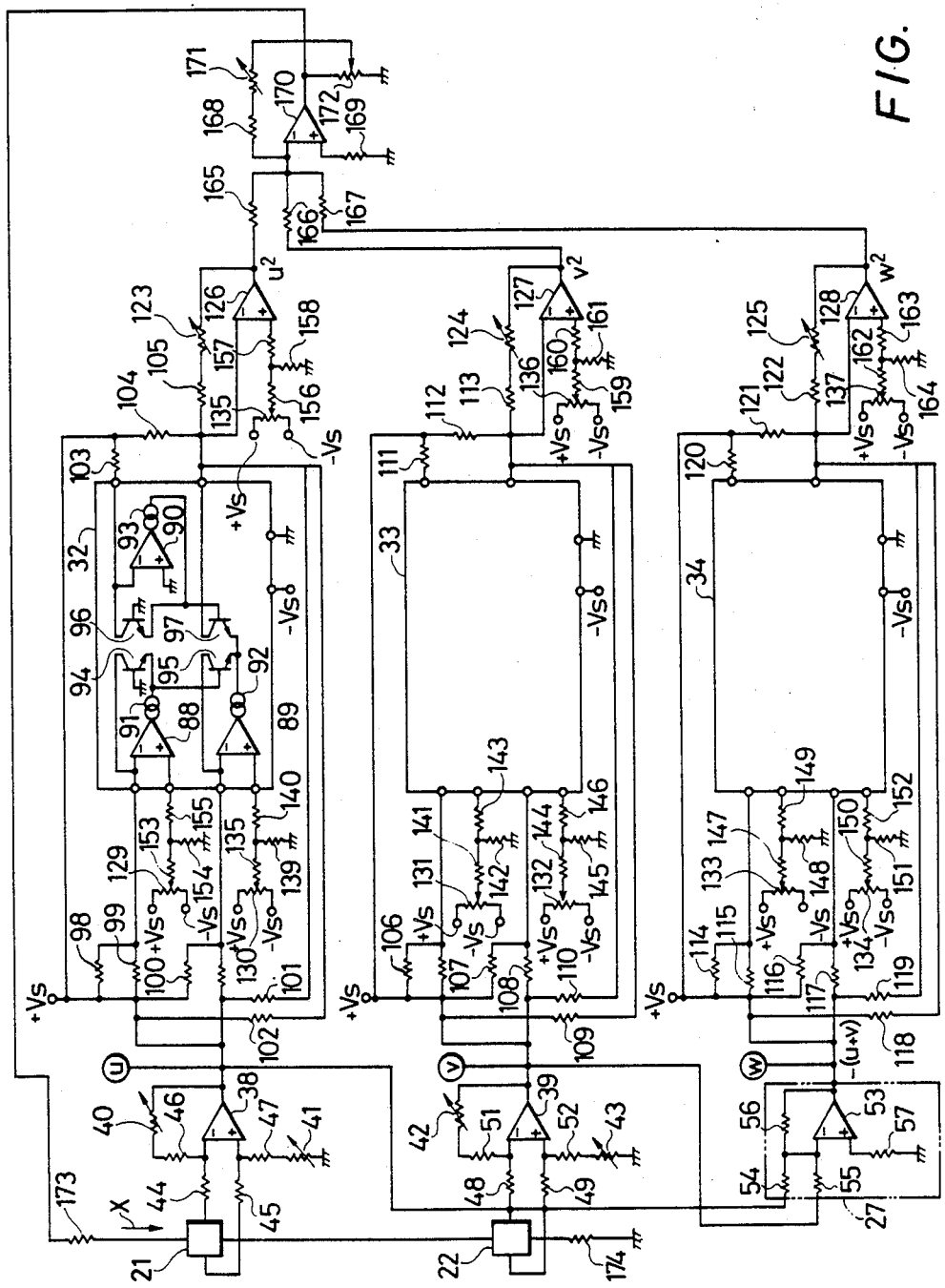
FIGS. 6 and 7 are circuit diagrams showing the embodiment of the invention.
Figure 7:
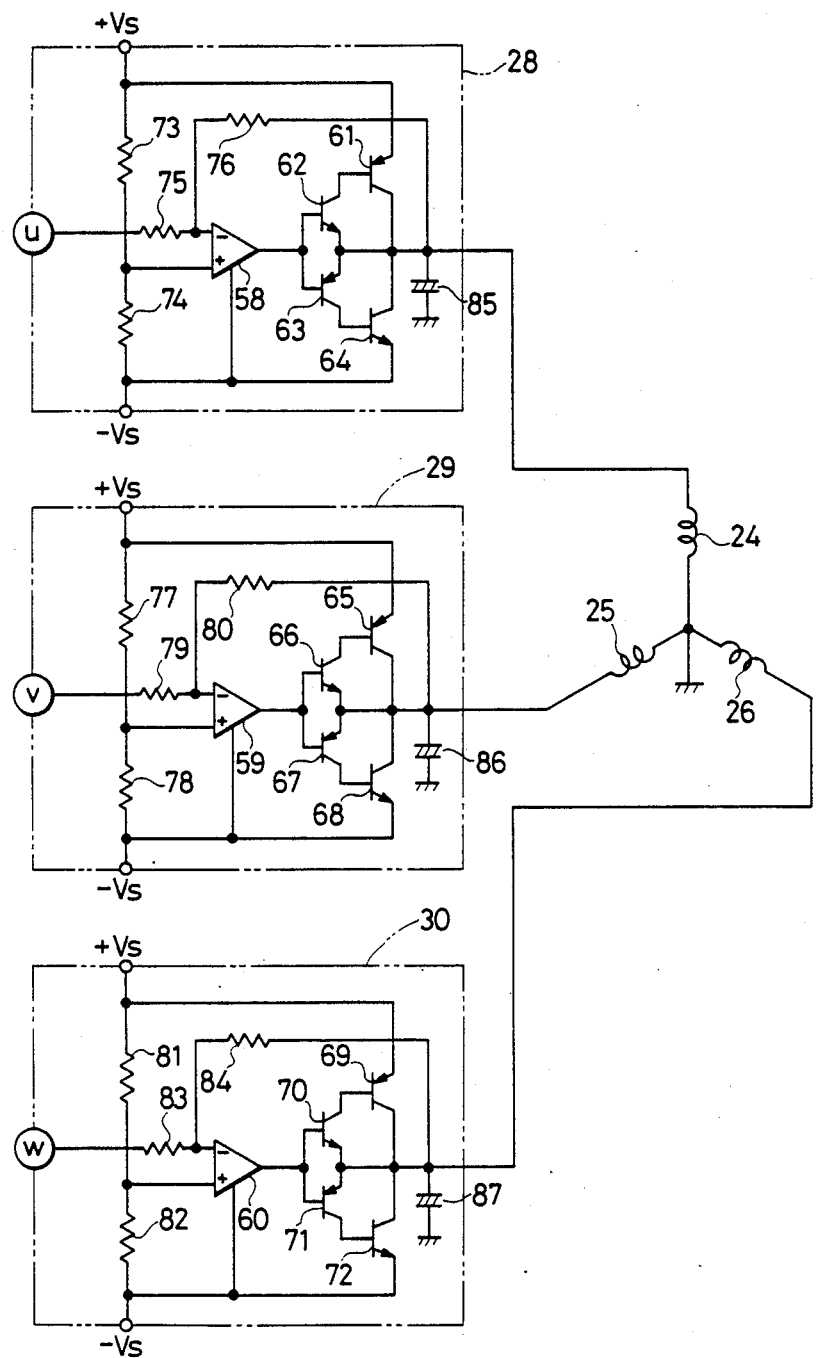

FIGS. 6 and 7 illustrate in detailed schematic form one embodiment of this invention. The output of the Hall element 21 is applied to the multiplying circuit 32 (FIG. 6) and the amplifier 28 (FIG. 7) through an amplifier which comprises an operational amplifier 38, variable resistors 40 and 41 and resistors 44, 45, 46 and 47. Similarly, the output of the Hall element 22 is applied to the multiplying circuit 33 and amplifier 29 through an amplifier which comprises an operational amplifier 39, variable resistors 42 and 43, and resistors 48, 49, 51 and 52. The outputs u and v of the operational amplifier 38 and 39 are applied to the adder 27 which comprises an operational amplifier 53 and resistors 54 through 57. In the adder 27, the outputs u and v are added, and the result of addition is inverted, so that $w = -(u+v)$ is outputted. The output w of the adder 27 is applied to the multiplying circuit 34 and the amplifier 30. The amplifier 28 comprises an operational amplifier 58, transistors 61 through 64, resistors 73 through 76, and a capacitor 85. The amplifier 29 likewise comprises an operational amplifier 59, transistors 65 through 68, resistors 77 through 80, and a capacitor 86. Similarly, the amplifier 30 comprises an operational amplifier 60, transistors 69 through 72, resistors 81 through 84, and a capacitor 87. These amplifiers 28, 29 and 30 amplify the inputs u, v and w to drive coils 24, 25 and 26, respectively.

The multiplying circuits 32, 33 and 34 are commercially available integrated circuits each comprising, as shown in FIG. 6, operational amplifiers 88 through 90, current sources 91 through 93, and transistors 94 through 97. The integrated circuits 32–34, without further components, operate in a current mode. However, the integrated circuits 32, 33 and 34 are provided with resistors 98 through 122, variable resistors 123 through 125 and operational amplifiers 126 through 128 so that the circuits 32, 33 and 34 are made to operate in a voltage mode. Furthermore, the circuits 32–34 are provided with variable resistors 129 through 137 and resistors 138 through 164 in order to effect offset adjustments.

The output voltages $u^2$, $v^2$ and $w^2$ of the amplifiers 126–128 are applied to an addition circuit comprising resistors 165–169, an operational amplifier 170 and variable resistors 171 and 172. The addition circuit supplies current through resistors 173 and 174 to the Hall elements 21 and 22, and the current is controlled so that $u^2+v^2+w^2$ is maintained constant.

Figure 8:
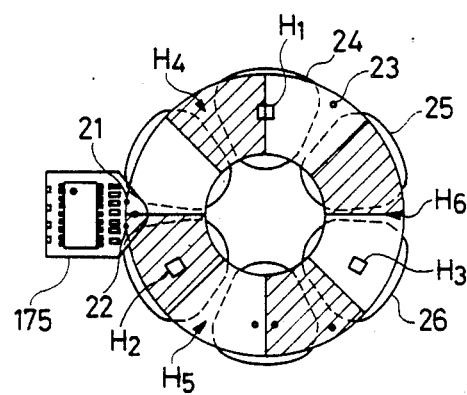
FIG. 8 is a schematic plan view illustrating one example of a module mounted on a motor incorporating the invention.

The brushless motor drive circuit can be formed into a module 175, illustrated in FIG. 8, which is integral with the Hall elements 21 and 22 over the rotor 23. The circuit thus formed is both small in size and high in reliability. In FIG. 8, reference characters $H_1$–$H_3$ or $H_4$–$H_6$ designate conventional Hall element positions.

In the above-described embodiment, based on the fact that the sum of the squares of $\sin\theta$, $\sin(\theta-\frac{2}{3}\pi)$ $\sin(\theta-4/3\pi)$ is maintained constant, feedback is applied to the inputs of the Hall elements 21 and 22 so that the sum of the squares of the outputs u and v of the Hall elements 21 and 22 and the square of the output w of the adder 27 is constant. On the other hand, the sum S of the y-th powers of the sine waves of the three phases is:

$$S = \sum_{K=1}^{3} \sin^y\left(\theta - \frac{360°(K-1)}{3}\right)$$

When y is an even number, S becomes constant, independent of the value of $\theta$. Accordingly, in the case also where multiply circuits are used to obtain the y-th powers of u, v and w, the three-fold sum of the y-th powers thus obtained becomes constant. Then the sum is fed back to the inputs of the Hall elements so that the same effect can be obtained. In this case, it is necessary that y is set to an even number so that the above-described sum is a non-zero, constant value.

As is apparent from the above description, according to the invention, the output signals of the two position detectors are added in order to synthesize third-phase signals, and therefore the three-phase balancing condition can be held. Accordingly, even if a single power source is employed, the imaginary ground potential is maintained constant, with the result that the rotation system is stabilized. Furthermore, the multiplying circuits are used to obtain higher order powers of the output signals of the two position detectors and of the output signal of the synthesizing unit. The power exponent is set to an even number so that the sum of these powers becomes constant. Furthermore, the sensitivities of the position detectors are so controlled that the above-described sum becomes a constant. Accordingly, even if the position detectors fluctuate in amplitude, phase and offset among three phases thereof, the torque ripple can be decreased, and the peak values and the supply voltage clipping levels of the various phases can be made equal to one another. Although the motor is operated in three-phase drive mode, two position detectors are employed. Therefore, in the case where a high precision motor is used, adjustment of the input signals can be achieved by adjusting the signals of only two phases, thus simplifying the circuit. Because the circuit can be provided in the form of a module, the circuit can be small in size and high in reliability.

We claim:

1. A drive circuit for a brushless motor, comprising:
    a rotor magnet magnetized to have 2n poles (n being an integer which is greater than zero);
    three-phase drive coils for rotating said rotor magnet;
    two position detectors for detecting a rotational position of said rotor magnet and providing first and second phase output signals having a phase difference of substantially 120° in electrical angle, each of said first and second phase output signals being branched into a first branch signal and a second branch signal;
    a synthesizing circuit for adding said two first branch signals and synthesizing an output signal for a third phase output signal;
    three amplifier means, respectively receiving as inputs said two second branch signals and said third phase output signal, for driving respective ones of said drive coils;
    multiplying means for raising full bandwidth portions, with respect to an operating frequency of said rotor magnet, of said two second branch signals and said third phase output signal prior to said amplifier means to a positive even power;
    means for adding the two second branch signals and the third phase output signal raised to said power by said multiplying means to form a sum signal; and
    means for producing a correction signal in response to said sum signal, said correction signal being applied to said two position detectors for controlling said two position detectors in such a manner as to maintain said sum signal constant.

2. A drive circuit as recited in claim 1, wherein the distribution of magnetization of said rotor magnet magnetized to have 2n poles is made substantially sinusoidal in the direction of rotation of said rotor magnet; and
    wherein said phase output signals of said two position detectors which have detected a rotational position of said rotor magnet are substantially sinusoidal for synthesizing the third phase output signal to be substantially sinusoidal.

3. A drive circuit as recited in claim 1, wherein said detectors are Hall elements and said correction signal controls a common current through said two Hall elements, whereby the sensitivity of said Hall elements is controlled.

4. A drive circuit for a brushless motor, comprising:
    a rotor magnet magnetized to have 2n poles (n being an integer which is greater than zero);
    two position detectors for detecting a rotational position of said rotor magnet and providing first sinusoidal outputs signals having a 120° phase difference therebetween;
    means receiving said first sinusoidal output signals for producing three phase output signals having phase differences therebetween of substantially 120° in electrical angle;
    three phase drive coils for rotating said rotor magnet;
    three amplifier means, each of said amplifier means having an input receiving a respective one of said three phase output signals and an output driving a respective one of said drive coils;
    multiplying means for raising a full bandwidth portion, with respect to an operating frequency of said rotor magnet, of each of said three phase output signals prior to said amplifier means to a positive even power;
    means for adding the three phase output signals raised to said power by said multiplying means to form a sum signal; and
    means for producing a correction signal in response to said sum signal, said correction signal being applied to said two position detectors for controlling said two position detectors in such a manner that said sum signal remains constant.

* * * * *